United States Patent [19]

Suomala et al.

[11] Patent Number: 4,718,933
[45] Date of Patent: Jan. 12, 1988

[54] INTERNALLY COOLED GOB CHUTE

[75] Inventors: John E. Suomala, Weatogue; Robert J. Duga, Enfield, both of Conn.

[73] Assignee: Emhart Industries, Inc., Farmington, Conn.

[21] Appl. No.: 916,579

[22] Filed: Oct. 8, 1986

[51] Int. Cl.⁴ .............................................. C03B 7/08
[52] U.S. Cl. ...................................... 65/327; 65/128; 65/225; 65/356
[58] Field of Search ................. 65/327, 326, 356, 128, 65/225, 304

[56] References Cited
U.S. PATENT DOCUMENTS 3,721,544  3/1973  Bystrianyk et al. .............. 65/225 X
3,775,083  11/1973  Nebelung et al. ...................... 65/225

Primary Examiner—Arthur Kellogg
Attorney, Agent, or Firm—Spencer T. Smith

[57] ABSTRACT

A fluid transferring mechanism especially adapted for providing cooling fluid to the scoops of a glass gob distributor having a housing and an oscillating member mounted therein. The housing has inlet and outlet passageway having an exit and entrance respectively at the interface between the housing and oscillating member. The oscillating member has first and second grooves in its outer surface which communicates with the exit and entrance respectively during the entire oscillation of the oscillating member. A passageway connects the first and second grooves to provide a path for the fluid from the inlet and outlet passageways.

4 Claims, 5 Drawing Figures

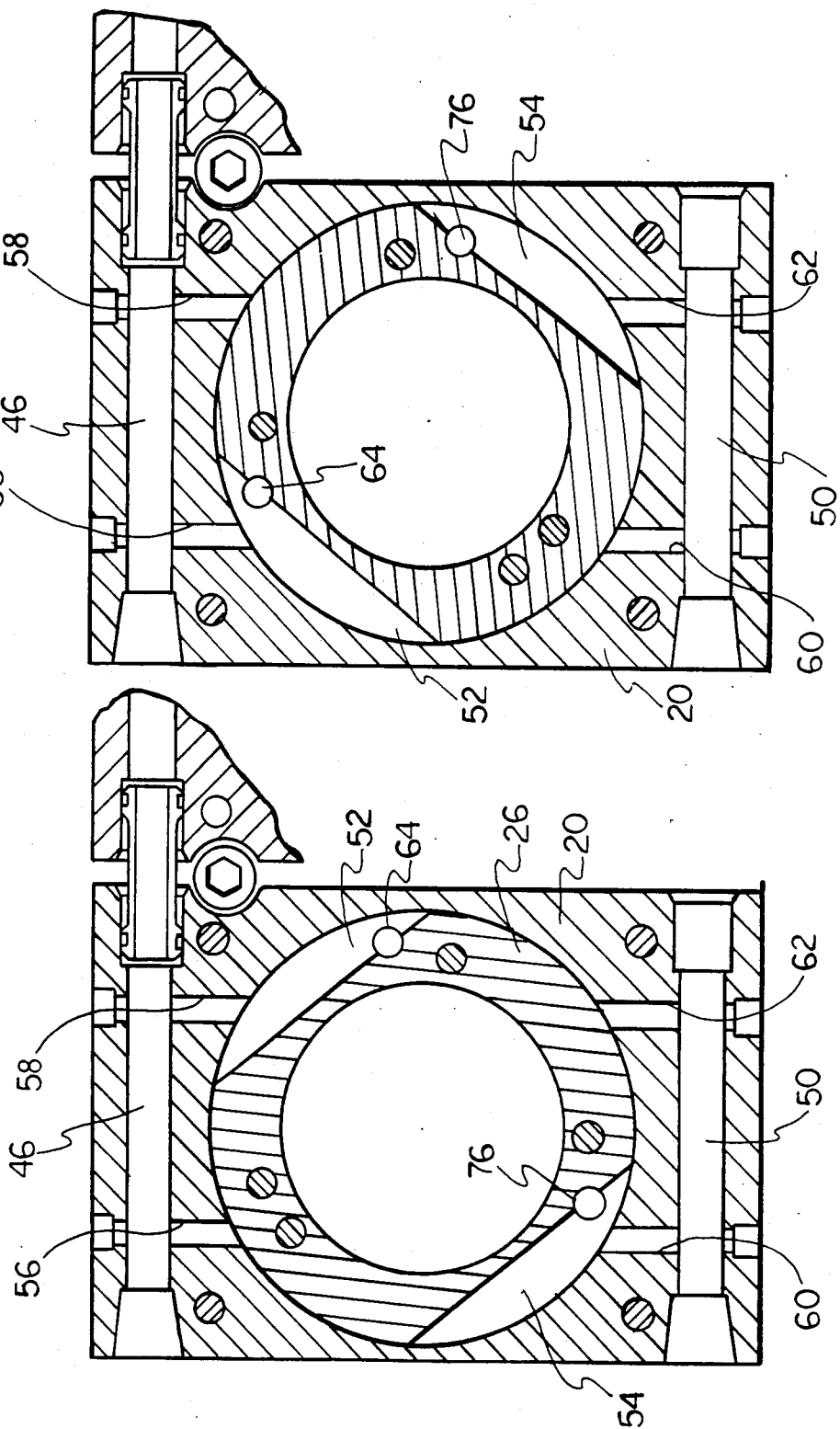

INTERNALLY COOLED GOB CHUTE

BACKGROUND OF THE INVENTION

This invention relates generally to a mechanism for transferring fluid from a stationary member to an oscillating member. More particularly, this invention has particular application in the transfer of cooling fluid from a stationary member to an oscillating scoop of a gob distributor mechanism used to distribute gobs of glass from a feeder to the delivery troughs of a glassware forming machine.

In U.S. Pat. No. Re. 28,759 there is described a molten glass gob distribution system which utilizes a single scoop for each gob being formed at the feeder bowl for distributing the gobs to a plurality of fixed troughs arranged in groups. Each group of troughs is associated with one particular section of a glassware forming machine of the I.S. type and each trough of each group is associated with a particular mould of that particular section of the glassware forming machine. The scoops serve to sequentially distribute the groups of glass gobs as they are formed at the outlet spout of the feeder bowl into the fixed troughs associated with the glassware forming machine.

The scoops are adapted for continuous use in feeding glass gobs to a plurality of troughs for the entire glassware forming machine. As a result of this continuous use, it has been found desirable that the individual scoops be cooled to prevent undue heat build-up caused by the continuous contact therewith of the hot gobs of glass. The above mentioned U.S. Pat. No. Re. 28,759 discloses two methods of accomplishing the cooling of the scoops. According to one method, cooling fluid such as water is introduced into an annular passageway in the housing and then through a collar on which the annular gear is defined into an spirally shaped groove in the inner portion of the tubular funnel and downwardly and outwardly through a vertical passageway into an aligned passageway defined in the arcuate scoop portion.

Another method of cooling the scoops is also shown in the above mentioned Reissue Patent which includes feeding the cooling fluid such as water from a source directly to the scoop through an inlet port downwardly through an internal passageway on one side of the scoop and then upwardly through a passageway on the opposite side of the scoop to an outlet port.

In connection with the first cooling arrangement discussed above, the flow of cooling fluid through the upper portion of the gob distributor assembly through the spiral passageway into a passageway in the scoop required extensive machining of the components of the upper portion and also resulted in a tendency for the cooling fluid to have a detrimental effect upon the bearings used to rotatably the support the collar member and gear. With regard to the second arrangement the inlet and outlet ports of the scoop were connected to a source of cooling fluid by means of flexible lines. However, it has been found that as the speed of oscillation of the scoops has increased, such flexible connections tend to begin to deteriorate through usage.

SUMMARY OF THE INVENTION

It is an object of the present invention to provide an improved means for distributing fluid from a stationary member to an oscillating member.

It is a specific object of the present invention to provide an improved means for cooling the scoops of a oscillating gob distributor which overcomes the disadvantages of the prior art systems.

These and other objects and advantages of the invention may be accomplished through the provision of stationary housing in which an oscillating member is mounted. The housing may be provided with spaced inlet and outlet passageway means having an exit and an entrance respectively at the innerface between the housing and the oscillating member. The oscillating member may have a first groove in its outer surface at the interface and a second groove in its outer surface at the interface, said first and second grooves being in communication with the inlet and outlet passageway means respectively during the entire oscillation of the oscillating member, and passageway means providing fluid connection between the first and second grooves.

BRIEF DESCRIPTION OF THE DRAWINGS

FIG. 4 is a view similar to FIG. 3, but showing the distribution member rotated relative to the manifold in a clockwise direction to the limit of the clockwise oscillation of the scoop; and FIG. 5 is a view similar to FIG. 3, but showing the distributor member rotated relative to the manifold member in a counterclockwise direction to the limit of the counterclockwise oscillation of the scoop.

DETAIL DESCRIPTION

Figure 1:
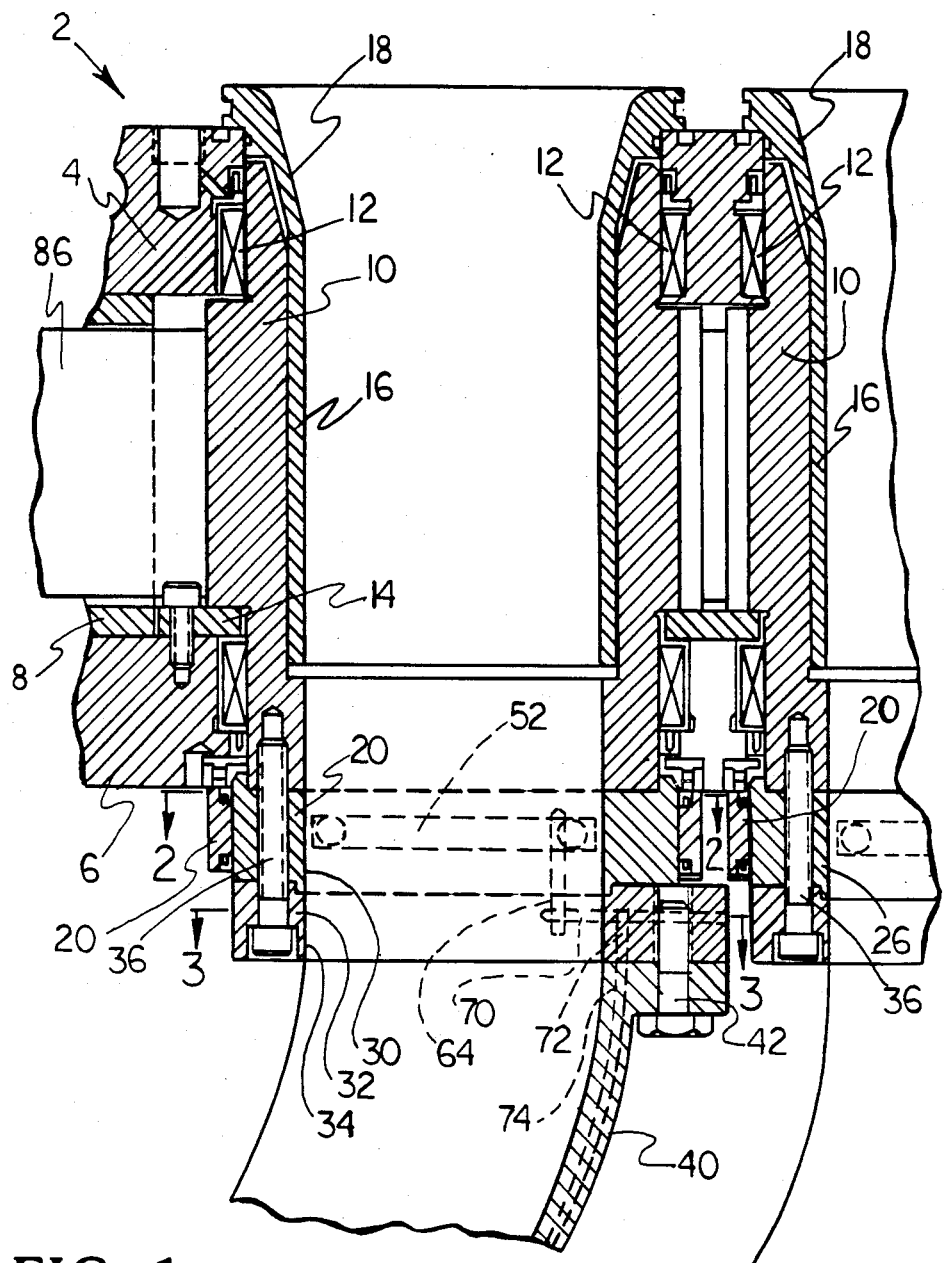
FIG. 1 is a vertical sectional view taken through the housing assembly of a gob distributor mechanism incorporating the present invention.

Referring the drawings and in particular FIG. 1, the gob distributor mechanism may include a three piece housing 2 consisting of upper and lower plate members 4 and 6 respectively, and an intermediate member 8. Mounted in appropriate openings in the housing 2 are hollow gears 10, supported for oscillating movement within the housing 2 by means of bearings 12 and a lower bearing plate 14. A funnel member 16 is press fit into each of the hollow gears 10 and has an upper outwardly tapering surface 18 to assist in guiding the gobs.

A manifold 20, one in axial alignment with each gear 10, is attached by screws 22 to the bottom of the bottom plate 6 of the housing 2 and has a bore 24 therethrough in which a distributor member 26 is mounted for oscillatory movement relative to the manifold 20. The distributor member 26 has a bore 30 therethrough of a diameter substantially equal to the internal diameter of the funnel number 16. A scoop holder 32 is mounted below the distributor member 26 and has a bore 34 therethrough concentric with the bore 30 of the distribution member 26. The scoop holder 32 and distributor member 26 are attached to the lower end of the oscillating gear 10 by means of screws 36. Dowel members 38 are provided between the scoop holder and distributor member 26 and between the distributor member 26 and gear 10 to aid in the alignment of the respective parts.

A scoop member 40 is attached to each scoop holder 32 by means of screws 42. Locating dowels 44 may be provided to aid in the alignment of the scoop member 40 with respect to its associated scoop holder 32. With the above described arrangement, each scoop member 40, scoop holder 32, and distributor member 26 are all fixedly secured to each other and to their respective gear 10 and are able to oscillate therewith. The gear 10 oscillates within the housing 2 and the distributor member 26 oscillates within the manifold 20. The number of scoop members 40 and associated scoop holders 32, distributor member 26, manifolds 20 and gears 10 depend upon the number of gobs being severed from the feeder at a given time, i.e., whether the gob distributor is being used to, feed a single, double, triple or more gob machine.

Each manifold 20 is provided with an inlet passageway 46 which is connected to a source of cooling fluid. In the present case, the preferred cooling fluid is water. The inlet passageways 46 of each manifold 20 associated with each scoop member are inner-connected by means of a tubular connector 48. Each manifold 20 is also provided with an outlet passageway 50 which are interconnected by a similar tubular connector (not shown).

Figures 2, 3:
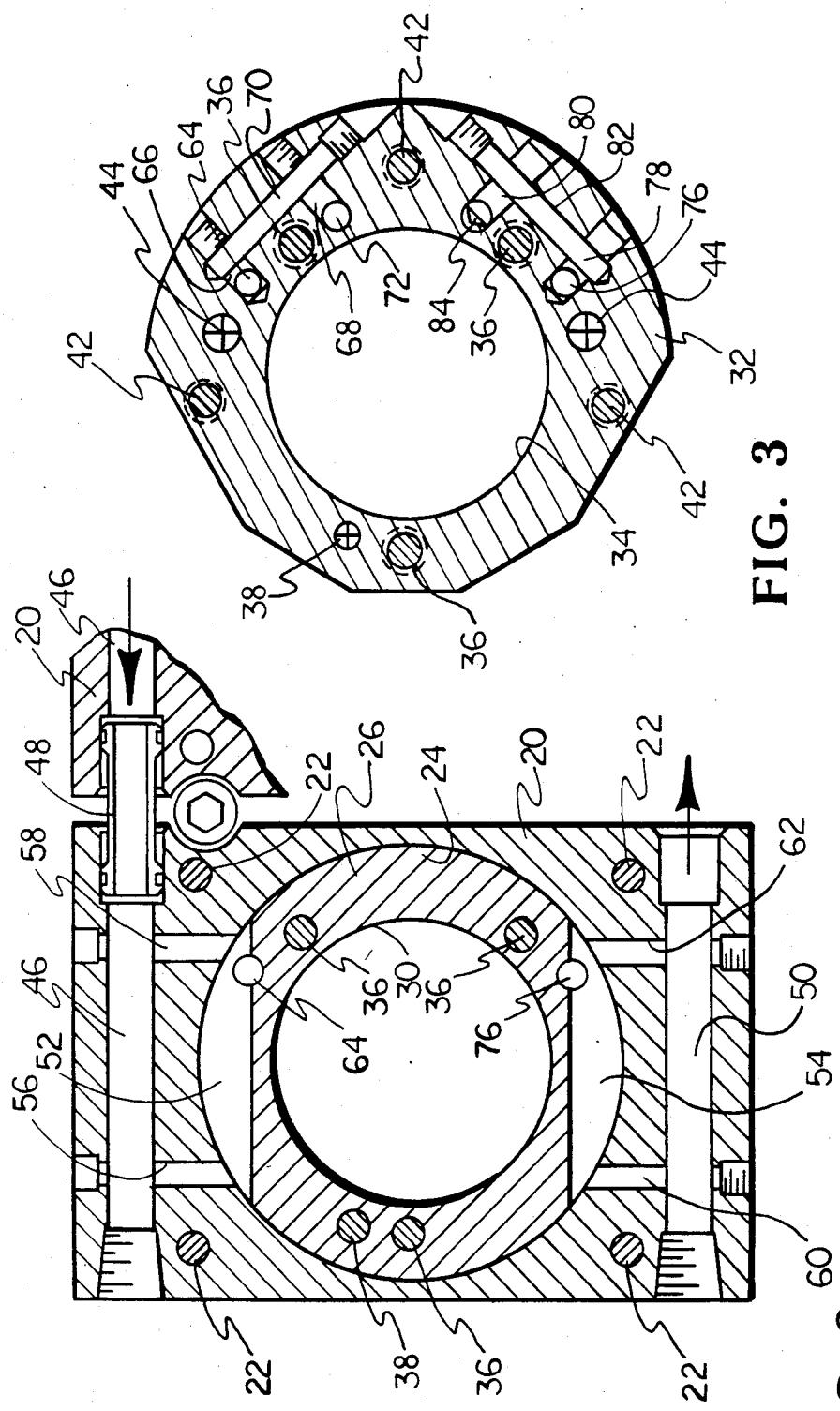
FIG. 2 is a horizontal sectional view taken along the lines II—11 of FIG. 1.
FIG. 3 is a horizontal sectional view taken along the lines III—III of FIG. 1.

Each distributor member 26 is provided with a set of opposed grooves 52 and 54 in its outer surface. Parallel spaced passageways 56 and 58 extend transversely from the inlet passageway 46 in the manifold 20 to the interior surface thereof at the interface between the manifold 20 and distributor member 26. Both of the the passageways 56 and 58 open into the groove 52 in the distributor member 26 when the distributor member 26 is in its intermediate position as shown in FIG. 2. Similarly, spaced parallel passageways 60 and 62 extend transversely from the outlet passageway 50 in the manifold 20 to the interior surface thereof at the interface between the manifold 20 and distribution member 26 and communicate with the groove 54 in the distributor member 26 when the distributor is in intermediate position.

A vertically extending connector passageway 64 connects the groove 52 with a horizontally extending passageway 66 in the scoop holder 32. The horizontal passageway 66 in the scoop holder is connected to a second spaced horizontal passageway 68 by a horizontal connecting passageway 70 extending transversely thereto. The second horizontal passageway 68 communicates with a vertically downwardly extending passageway 72 in the scoop holder 32 which in turn is aligned with an entrance cooling passageway 74 in the scoop member 40.

A similar passageway arrangement is provided for in connection with the outlet passageway 50 in each manifold 20. A vertical extending connector passageway 76 connects the groove 54 in the manifold 20 to a horizontally extending passageway 78 in the scoop holder 32 which is interconnected with a spaced horizontal passageway 80 by means of a horizontal connecting passageway 82. The second horizontal passageway 80 communicates with a vertically downwardly extending passageway 84 in the scoop holder 32 which in turn is aligned with a return passage (not shown) in the scoop member 40.

With the above described arrangement, cooling fluid is supplied to each stationary manifold 20 into the inlet passageway 46 where it flows through one or both of the horizontal spaced passageways 56 and 58 to the groove 52 in distributor member 26. The cooling fluid then flows through the vertical passage 64 in the distributor member 20 and scoop holder 32, through, horizontal passageways 66, 68, 70 down through vertical passageway 72 into the entrance of the inlet cooling passageway 74 in the scoop member 40. The inlet cooling passageway 74 in the scoop member 40 is interconnected at the lower end of the scoop (not shown) with the return passageway (not shown) which is in alignment with and communicates with the vertically extending passageway 84 in the scoop holder 32 so that fluid can travel up through that passageway 84, through horizontal passageways 78, 80, 82 in the scoop holder 32, and up through the vertical connection passageway 76 into the groove 54 in the distributor member 26. The cooling fluid may then pass through one or both of the spaced passageways 60 or 62 to the outlet passageway 50 in the manifold 20.

In operation, the scoops are driven by means of a rack 86 which extends horizontally in the housing 2 and meshes with the gears 10. The reciprocation of the rack 86 may be achieved by means of a cam such as shown in the above mentioned Reissued Patent, or alternatively, may be driven by a motor such as a servo motor or stepping motor. The reciprocation of the rack causes oscillation of the gears 10, distributor members 26, scoop holders 32 and scoop members 40 about a vertical axis which extends through the upper end of the scoop members 30.

The spacing of the passageways 56 and 58 leading from inlet passage 46 and the spacing of the passageways 60 and 62 leading from the outlet passageway 50, as well as the distance the grooves 52 and 54 extend about the periphery of the distributor member 26 are such that when the scoop member 40 has been oscillated to its limit in a clockwise direction as viewed in FIG. 4, only passageways 58 and 60 communicate with the grooves 52 and 54 respectively in the distributor member 26. Passageways 56 and 62 are blocked by the distributor member 26. When the scoop is oscillated to its limit in a counter-clockwise direction as shown in FIG. 5, only the passageways 56 and 62 communicate with the grooves 52 and 54 respectively and passageways 58 and 60 are blocked. Thus it is seen that during the entire oscillatory motion of the scoop members 40, the grooves 52 and 54 in the distributor member 26 are always in communication with at least one of the passageways leading from the inlet and to the outlet so that circulation to the cooling fluid takes place throughout the entire cycle of oscillation of the scoop members 40.

It is to be noted that the specific arrangement of horizontal and vertical passageways that has been described and shown for interconnecting the grooves 52 and 54 in the periphery of the distributor member 26 with the inlet and return passageways in the scoop member 40 enables the use of existing cooling passages in existing scoop members. Because of space and design limitations, it was necessary to provide for a jog between the vertical passageways 64 and 76 communicating with the grooves 52 and 54 in the distributor member and the vertical passageway communicating with the cooling passageways in the scoop members 40. It is within the purview of this invention that the vertical passageways in the distributor member 26 be connected directly to passageways in the member connected thereto. Additionally, the distributor member may be formed directly in the oscillating member.

While reference has been made above to a specific embodiment of this invention, various alterations and modifications will readily suggest themselves to previous skilled in the art. It is intended, therefore, that the foregoing description be considered as exemplary only, and that the scope of this invention be ascertained from the following claims.

What is claimed is:

1. A gob distributor comprising
   housing means, and
   at least one gob guide means rotatably supported by said housing means, said gob guide means including funnel means for receiving gobs from a gob feeder,
   scoop means below said funnel means for redirecting a gob received by said funnel means,
   said scoop means including a conduit having an inlet and an outlet for directing cooling liquid therethrough and
   distributor means intermediate said scoop means and said funnel means,
   said distributor means being cylindrical and having a pair of grooves defined at opposed locations in said cylindrical surface and having inlet and outlet conduits communicating with the respective end of said scoop means conduit and with one of said grooves,
   said housing means including a manifold having a cylindrical bore matingly engaging with the cylindrical portion of said distributor means whereby opposed volumes will be defined therebetween, said opposed volumes having a range of displacement as said gob guide means is rotated relative to said housing means, and
   said manifold means including inlet and outlet conduit means communicating with said respective volume throughout its range of displacement.

2. A gob distributor according to claim 1 wherein said funnel means includes hollow gear means adapted to be driven by a rack.

3. A gob distributor according to claim 2, wherein said funnel means further includes a funnel member.

4. A gob distributor according to claim 3, wherein each of said inlet and outlet conduit means of said manifold means includes a pair of spaced conduits communicating with the central bore thereof.

* * * * *